US009134982B2

(12) United States Patent
Bourne (10) Patent No.: US 9,134,982 B2
(45) Date of Patent: Sep. 15, 2015

(54) AUTOMATED CONFIGURATION AND INSTALLATION OF VIRTUALIZED SOLUTIONS

(75) Inventor: Steven Bourne, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1027 days.

(21) Appl. No.: 12/684,946

(22) Filed: Jan. 10, 2010

(65) Prior Publication Data

US 2011/0173605 A1 Jul. 14, 2011

(51) Int. Cl.
*G06F 9/445* (2006.01)

(52) U.S. Cl.
CPC ........................................ *G06F 8/61* (2013.01)

(58) Field of Classification Search
USPC .......................................................... 717/176
See application file for complete search history.

(56) References Cited

U.S. PATENT DOCUMENTS

| 7,577,722 | B1 | 8/2009 | Khandekar et al. |
| 7,596,615 | B2 | 9/2009 | Satkunanathan et al. |
| 7,979,520 | B2* | 7/2011 | Hardwick et al. ............ 709/223 |
| 2003/0217131 | A1 | 11/2003 | Hodge et al. |
| 2005/0193103 | A1 | 9/2005 | Drabik |
| 2007/0078988 | A1* | 4/2007 | Miloushev et al. .......... 709/227 |
| 2008/0028389 | A1* | 1/2008 | Genty et al. .................. 717/174 |
| 2008/0059556 | A1 | 3/2008 | Greenspan et al. |
| 2008/0155537 | A1 | 6/2008 | Dinda et al. |
| 2009/0006070 | A1* | 1/2009 | Sasatani et al. ................. 703/22 |
| 2012/0079477 | A1* | 3/2012 | Boss et al. ..................... 717/178 |
| 2013/0247070 | A1* | 9/2013 | Larimore et al. ............. 719/312 |
| 2013/0263111 | A1* | 10/2013 | Boss et al. ..................... 717/176 |
| 2014/0289314 | A1* | 9/2014 | Dare et al. .................... 709/203 |

FOREIGN PATENT DOCUMENTS

| CN | 101470621 A | 7/2009 |
| CN | 101493781 A | 7/2009 |

OTHER PUBLICATIONS

"Managing Virtualized Environments in Application Context with EMC Smarts Application Discovery Manager v6.0", Retrieved at <<http://www.vmware.com/files/pdf/partners/emc/emc-ema-managing-virtualized-environments-whitepaper.pdf, May 2008, pp. 1-5.
"Seven Requirements for Balancing Control and Agility in the Virtual Environment", Retreived at <<http://documents.bmc.com/products/documents/62/88/96288/96288.pdf>>,2008, pp. 11.

(Continued)

*Primary Examiner* — John Chavis
(74) *Attorney, Agent, or Firm* — Henry Gabryjelski; Kate Drakos; Micky Minhas (57) ABSTRACT

An installation system for a multiple device, multiple application solution may include options for installing and configuring one or more of the devices as virtual machines. The installation system may start from bare hardware, install a virtual machine host, and configure one or more devices as virtual machines. The installation system may provide a set of predefined configurations from which an administrator may choose, and some embodiments may provide various algorithms or optimization routines to select an appropriate configuration based on intended uses or other factors. The configurations may be customized to create one or more documents that may be consumed during the installation process to automate many configuration settings.

20 Claims, 6 Drawing Sheets

(56) References Cited

OTHER PUBLICATIONS

"Xenocode Releases New Version of Virtual Application Studio", Retreived at <<http://www.cmcrossroads.com/news-a-events/12015-xenocode-releases-new-version-of-virtual-application-studio>>, Oct. 22, 2009, pp. 2.

"Second Office Action Issued in Chinese Patent Application No. 201110026551.1", Mailed Date: Jan. 12, 2015, 11 Pages.

"First Office Action and Search Report received for Chinese Patent Application No. 201110026551.1", Mailed date: Jun. 30, 2014, 17 Pages.

"Third Office Action Issued in Chinese Patent Application No. 201110026551.1", Mailed Date: May 18, 2015, 6 pages.

* cited by examiner

AUTOMATED CONFIGURATION AND INSTALLATION OF VIRTUALIZED SOLUTIONS

BACKGROUND

Installing complex software systems can be a lengthy and frustrating process even for experienced information technology professionals. Some complex software systems may operate on multiple hardware or software platforms to deliver multiple applications in a single solution.

For example, a business enterprise may use multiple applications to manage the business and provide computing services to employees and customers. The applications may include email applications, malware detection services, file services, as well as underlying services such as authentication, network management, device management, and other services. The 'solution' in this example may be many of the applications, services, and other components that enable the business to function effectively.

In many businesses, the computer infrastructure may include multiple devices that deliver portions of the overall solution. Multiple devices may be used for redundancy as well as load balancing or separation. Redundancy may be useful for some devices that provide widely used services, such as authentication services, where even a short outage may cause unwanted delays. Load balancing or load separation may be useful when one application or service may consume much of the processing or other bandwidth of a single device, so that having different servers with different applications may not overload one or more servers.

SUMMARY

An installation system for a multiple device, multiple application solution may include options for installing and configuring one or more of the devices as virtual machines. The installation system may start from bare hardware, install a virtual machine host, and configure one or more devices as virtual machines. The installation system may provide a set of predefined configurations from which an administrator may choose, and some embodiments may provide various algorithms or optimization routines to select an appropriate configuration based on intended uses or other factors. The configurations may be customized to create one or more set of installation settings that may be consumed during the installation process to automate many configuration operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An installation system may determine a installation settings that may be used to automatically install several devices, including some devices as virtual machines. The devices may perform various functions, and may be configured with the same or different applications and services. In many cases, the devices may be configured to operate in conjunction with each other to deliver a solution comprising multiple applications and services.

The installation system may install and configure operating systems, virtual machine hosts, virtual machine guests, as well as applications and services. The installation process may be highly automated by generating a set of installation settings that may be consumed by scripts, applications, or other automated systems that perform the installation and configuration.

The solution may be installed on various hardware topologies. For example, a three device solution may be installed on a single hardware platform with each device as a virtual device, or the same solution may be installed on two hardware platforms with one device installed natively on one hardware platform and two devices installed as virtual devices. The installation may be performed on bare hardware for which no operating system is installed, or on existing hardware platforms that may include virtual machine hosts.

The installation system may have several mechanisms to determine hardware topologies, including user input through dialog boxes or other interaction, as well as automated mappers that may gather hardware and software information from existing devices.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied (embedded?) in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
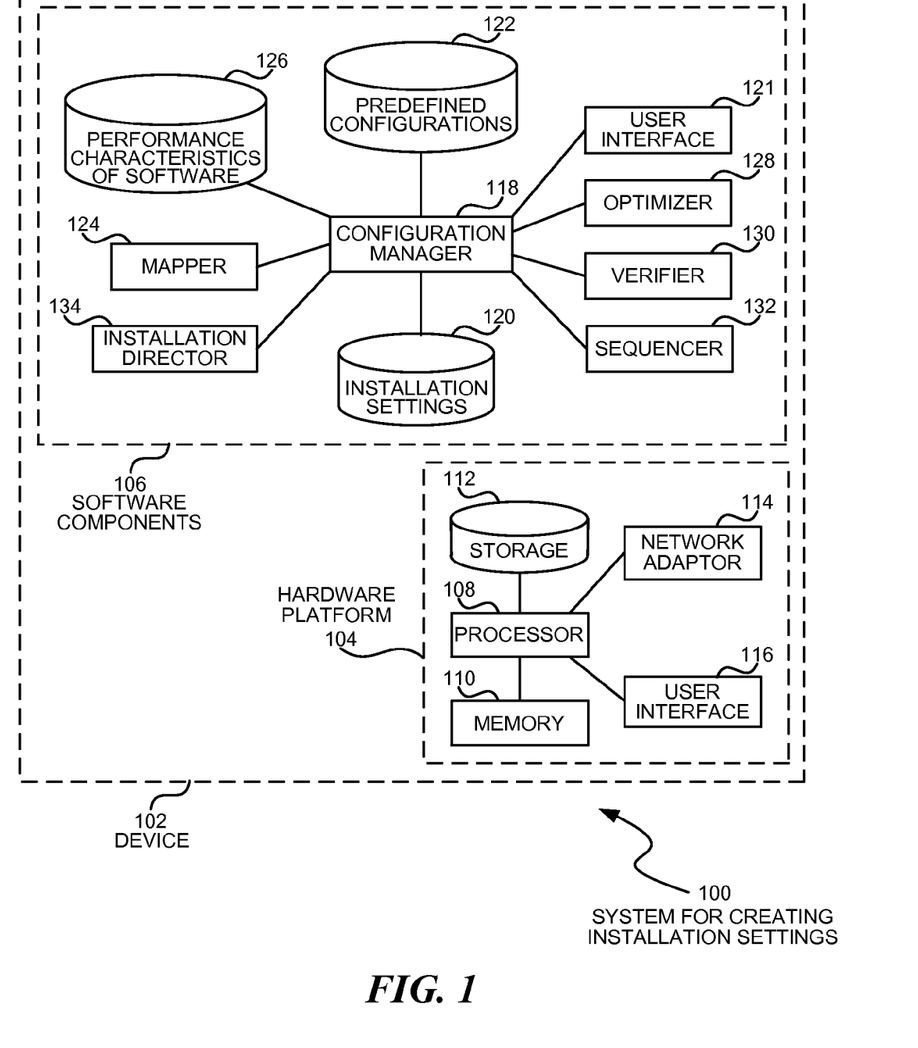
FIG. 1 is a diagram illustration of an embodiment showing a device that may be used to create a set of installation settings.

FIG. 1 is a diagram of an embodiment 100, showing a system for creating installation settings. Embodiment 100 is a simplified example of a device that may create installation settings that may be used to install and configure solutions that include multiple devices on various hardware platforms.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may prepare for the installation of multiple devices and applications on those devices. In many cases, the multiple devices and applications may provide a 'solution' that addresses a complex business goal, such as providing an information technology infrastructure for a business unit.

Preparing for installation may involve determining proper configurations of the various devices as well as options and other configuration parameters for applications that operate on the devices. A user interface may be used to gather information about the devices, the applications to be executed on the devices, as well as hardware topology on which the devices may operate.

Installation settings may define specific tasks, configuration settings, and other information that may be used to highly automate the installation and configuration process. The settings may be used by an installation manager to properly sequence an installation, configure operating system and applications, and prepare the device for operation.

In some cases, the devices may be installed as virtual machines. Virtual machines are software constructs that simulate a hardware device, and allow applications, services, and other software to operate as if the device were a normal, physical device. In many embodiments, a virtual machine may be an isolated duplicate of a real machine.

A virtual machine host is typically a physical machine with an operating system. The virtual machine host may have a virtual environment in which virtual machine guests may operate. The virtual machine guest may have its own dedicated operating system that may or may not be the same operating system as being executed on the virtual machine host. In many cases, the virtual machine guest may be a different operating system than that of the host.

Throughout this specification and claims, a 'device' may refer to an operating system and applications that operate on a hardware platform. In some instances, the 'device' may be a virtual machine, where the operating system and applications are virtualized and may operate with other virtual machines on a single hardware platform. In some references, the term 'device' may include both a hardware platform and software components, but in a virtual machine guest, the 'device' may only be a software implementation without a hardware component, and the virtual machine guest may operate on the hardware platform provided by a virtual machine host.

The device 102 is illustrated as a conventional computing device that has a hardware platform 104 and several software components 106. The device 102 may be a desktop computer, server computer, laptop computer, or any other computing device. In some embodiments, the device 102 may be a handheld computing device such as a mobile telephone or personal digital assistant.

The hardware platform 104 may include a processor 108, as well as random access memory 110 and nonvolatile storage 112. The hardware platform 104 may also include a network adaptor 114 and user interface 116.

The software components 106 are illustrated as separate components but may make up a single application in some embodiments. In a typical embodiment, the software components 106 may operate within an operating system environment.

A configuration manager 118 may create installation settings 120 that may be used to install, configure, and deploy multiple devices, each of which may operate one or more applications. In many cases, the devices may have applications that depend on or work together with other applications to form a solution.

The installation settings 120 may be used during an installation process to define a sequence of installation and to configure components that are installed or will be installed. The installation settings 120 may be consumed during operating system installation, application installation, or after installation to configure a device to perform an intended function.

The configuration manager 118 may have a user interface 121 that may be used to solicit information from a user in order to determine how a solution may be installed, configured, and deployed. A user may select the applications to be deployed, determine a hardware topology on which to install the devices to execute the applications, and determine various configuration settings and parameters.

The installation settings 120 may define how each of the various devices may be installed and deployed. The devices may be installed as virtual machine guest, or as a non-virtual machine directly on a hardware platform.

In many cases, some devices may be better suited for virtual deployment than other devices. For example, a device that performs gateway functions between a local area network and a wide area network may be better suited for deployment directly on a physical hardware platform. Such a device may perform malware scanning, quarantining, or other functions that may be better suited for a separate hardware platform.

The deployment of virtual or non-virtual devices may vary with the available hardware platforms. In some cases, two server platforms may be available but three or more devices may be installed. In such cases, at least two devices may be virtualized on a single hardware platform.

Some devices may be deployed as virtual devices when large amounts of growth may be expected or when an administrator wishes to have flexibility in hardware platforms. When two or more devices may be lightly used, the devices may be virtualized and consolidated on a single hardware platform. When the demand increases, the virtual devices may be moved to separate hardware platforms. Virtual devices may also allow the hardware platforms to be updated and modified without reinstalling and configuring the virtual device.

The configuration manager 118 may use a mapper 124 or other mechanism to determine a hardware topology. The hardware topology may identify the various hardware platforms in which the devices may be installed, and may include performance or other capabilities of the devices.

A mapper 124 may be an automated mechanism for querying a hardware device to determine characteristics of the device as well as parameters that may be configured. In some cases, the mapper 124 may be used to query hardware and software capabilities of existing virtual machine hosts, as well as settings used by the virtual machine host for configuring virtual machine guests.

In some embodiments, a user interface 121 may be used to collect hardware topology information. In embodiments where a new server or new hardware platform is available for installing a device, the new hardware platform may not have an operating system installed and a mapper 124 may not be able to detect and query such a hardware platform.

The user interface 121 may include interactive components, such as wizards, dialog boxes, or other mechanisms to gather configuration information about the hardware platforms. In some embodiments, various performance characteristics may be gathered for the hardware platforms, such as processor speed, amount and speed of random access memory, amount and speed of nonvolatile storage, network interface adaptors, peripheral devices, user interface devices, and other information.

The hardware topology may be used by the configuration manager 118 to determine an optimized placement of the various devices, as well as configuration settings for specific devices that may optimize the performance of certain applications on those hardware platforms.

The configuration manager 118 may assist a user in selecting an appropriate configuration for virtual and non-virtual devices in several manners. The configuration manager 118 may use a set of predefined configurations 122 that may define suggested or possible configurations. The configurations may identify which devices may be deployed as non-virtual devices, and which devices may be virtualized and, in some cases, combined with other virtual devices on a single virtual machine host.

In many embodiments, the configuration manager 118 may determine a hardware topology and then identify which of the predefined configurations 122 may be applicable to the current hardware topology, and present a subset of the predefined configurations 122 for a user to select.

Some embodiments may have an optimizer 128. An optimizer 128 may determine an optimized configuration for the devices on a given hardware topology. The optimizer 128 may operate in several different manners to determine an optimized placement, and may use performance characteristics of the software within each device to determine the device placement, at least in part.

In many cases, each device may have applications that have performance characteristics 126. The performance characteristics may define how a given application performs based on certain hardware configuration. For example, some software applications may use large amounts of random access memory and the application's performance may deteriorate substantially when small amounts of memory are present. Other software applications may be bounded by access to nonvolatile memory. Such applications may perform only as well as the bandwidth and speed of an attached disk drive. Still other applications may be bounded by the processor speed, capability, and parallelism. Such applications may operate fast when multiple processor cores are available, for example.

The optimizer 128 may evaluate the various devices to be installed and may match a device with a hardware platform on which the device may be installed. In one embodiment, the optimizer 128 may use heuristics or rules to select an optimized configuration. In such an embodiment, the optimizer 128 may assign a device with a memory-limited application to a hardware platform with large amounts of random access memory. In another example, the optimizer 128 may assign a device with large disk storage usage to a hardware platform with sufficient storage capacity.

In some embodiments, the optimizer 128 may create multiple scenarios and then evaluate the scenarios to select an optimized scenario. In such an embodiment, the optimizer 128 may identify many different scenarios that define assignments of devices on hardware platforms, and then rank each scenario based on the performance characteristics 126 to score or rank the scenarios. In many such embodiments, the optimizer 128 may identify many tens or hundreds of device placement scenarios to select an optimized scenario.

An optimizer 128 may take into account non-homogenous hardware platforms and many different performance characteristics of the applications within the devices to select an optimized solution. In some cases, an optimizing mechanism may identify an optimized solution that may be different from a simple heuristic or formulaic selection process.

The optimizer 128 may consider various scenarios where devices may be installed as virtual machines. In such scenarios, one, two, or more devices may be deployed as virtual machine guests on one or more virtual machine hosts.

The optimizer 128 may consider user preferences, company policies, and other factors in selecting an optimized scenario. For example, an administrator or company policy may be to optimize application performance. Such a policy may favor having high performance applications directly on a hardware platform without virtualization. In a different embodiment, the company policy may be to optimize flexibility and growth, which may favor having more devices virtualized so that they can be moved between hardware platforms.

The performance characteristics 126 may be predefined rules, best practices, or other characteristics of the software components. Such performance characteristics may be based on a generic implementation or guidelines provided by a software manufacturer, for example.

The performance characteristics 126 may be based in part on existing applications that may be operating in a hardware environment, in some embodiments. For example, assume that one or more devices to be installed provided email and other messaging services. The performance characteristics 126 may be populated in part by the characteristics of an existing messaging service that may be operating within the organization. In the example, the disk space consumed by an existing messaging service may be used as a baseline to select a hardware platform on which a device with a new messaging service may be installed. The new hardware platform may be chosen to have enough disk space based on the existing messaging database, for example.

A verifier 130 may verify that a selected scenario meets minimum qualifications. Some embodiments may allow a user to interact with the configuration manager 118 through a user interface 121 to select a configuration. In such embodiments, the user may interact with a user interface 121 to modify settings, assign different devices to different hardware platforms. As the user makes a change to a proposed setting, the verifier 130 may determine if the change is permitted or not, or whether the change may result in poorer performance or not.

In some embodiments, the verifier 130 may be used in conjunction with an optimizer 128 to screen out scenarios that do not meet minimum capabilities or configurations. In such embodiments, the verifier 130 may remove many possible scenarios from consideration by the optimizer 128 and reduce the processing time of the optimizer 128.

A sequencer 132 may determine an order for installation of the devices. In some embodiments, certain devices may have dependencies on other devices. More specifically, certain applications or services on some devices may have dependencies on applications or services on other devices. Based on those dependencies, an installation sequence may be defined.

Some dependencies may be two-way dependencies, where two devices may each depend on services or applications on the other device. In such cases, one device may be installed first and partially configured, then the other device may be installed and configured, then the first device may be further configured.

The installation settings 120 may include all of the information that may be used by an installation director 134 to cause an installation to be performed. The installation director 134 may be an application that causes an installation to be performed and may configure operating systems, virtual machine guests, virtual machine hosts, applications, services, and other components. In some embodiments, the installation director 134 may operate from the device 102 to cause an installation to be performed on another device. For example, the installation director 134 may cause a virtual machine guest to be created on a virtual machine host and install a device as the virtual machine guest.

Figure 2:
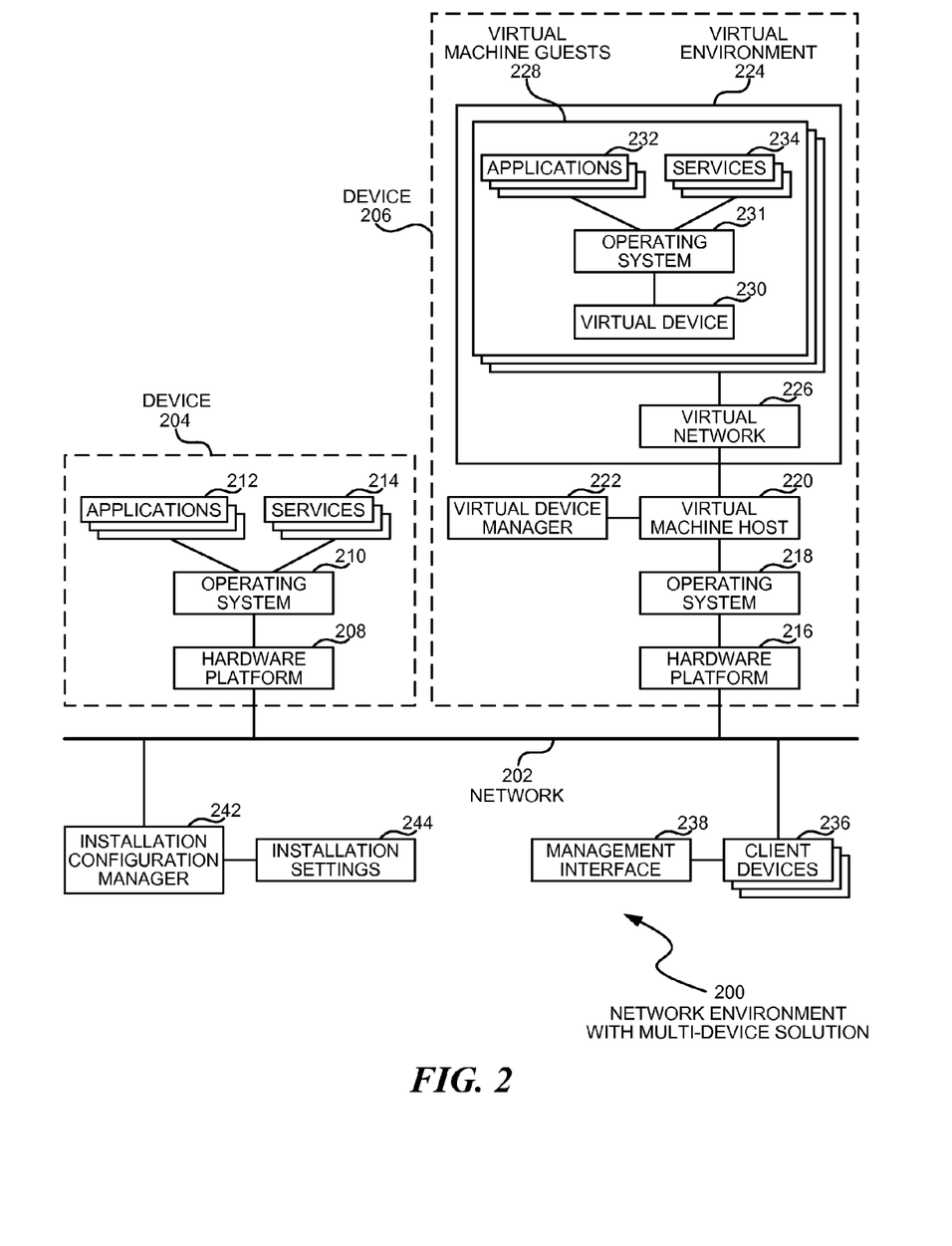
FIG. 2 is a diagram illustration of an embodiment showing a network environment in which a multi-device solution may be implemented.

FIG. 2 is a diagram of an embodiment 200, showing a network embodiment with a multi-device solution. Embodiment 200 is a simplified example of a network environment in which multiple devices may be installed to deliver a solution, and where some of the devices may be virtual devices.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 may be a simplified example of a network environment that may be found in a small business or other organization. A pair of server devices may provide various services for client devices. In a typical embodiment, the server devices may provide gateway connectivity, firewall, and filtering services, as well as file management and messaging services.

The solution that may be deployed in embodiment 200 may be three or more devices, but the solution may be deployed on a hardware topology of two hardware platforms.

A network 202 may have multiple devices attached. Devices 204 and 206 may be hardware platforms on which are installed applications and services using installation settings created by a configuration manager. The device 242 may be similar to the device 102 with a configuration manager application, and may create installation settings 244 that were used to install and configure devices 204 and 206.

Device 204 is illustrated as a hardware platform 208 on which an operating system 210 is installed. Applications 212 and services 214 are operable on the operation system 210.

The hardware platform 208 may be any hardware platform capable of executing the software components illustrated. One example of such a hardware platform may be the hardware platform 104 illustrated in embodiment 100. In the example of embodiment 200 of a company network, the hardware platform 208 may be a server computer, for example.

Figure 3:
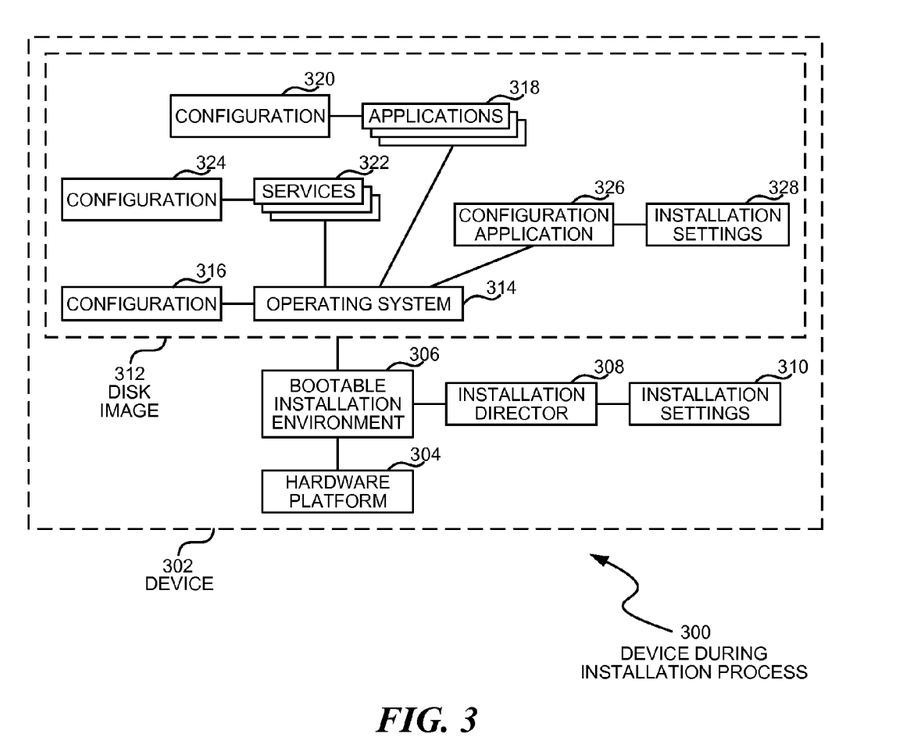
FIG. 3 is a diagram illustration of an embodiment showing a device during an installation process.

Device 204 may be a device that was installed in a non-virtual manner. Sometimes such an installation may be referred to as a direct or native installation. An example of such an installation is illustrated and discussed in embodiment 300 presented later in this specification.

Device 206 may be a device that contains a virtual machine host and several virtual machine guests. The device 206 may have a hardware platform 216 and an operating system 218. A virtual machine host 220 may execute within the operating system 218 with a virtual device manager 222. The virtual machine host 220 may create a virtual environment 224 on which one or more virtual machine guests 228 may operate.

Each virtual machine may have a virtual device 230. The virtual device 230 may be a software construct that simulates a hardware platform. In many cases, the virtual device 230 may be configured with specific amounts of random access memory, storage memory, network connections, and other components as would a hardware platform.

Because the virtual device 230 can be configured in software, each virtual device 230 may be differently configured. For example, some virtual devices may be configured with more random access memory or storage memory than other virtual devices. In some embodiments, the actual hardware components may be allocated to virtual devices 230. For example, each virtual device 230 may be allocated a portion of the memory contained in the hardware platform 216. In some embodiments, the total amount of memory allocated to virtual machines may be less than the total amount of memory on the hardware platform.

Each virtual device 230 may have its own operating system 231, on which applications 232 and services 234 may execute. In some embodiments, different virtual machine guests 228 may have different operating systems 231.

A virtual machine manager 222 may be an application that manages the various virtual machine guests 228. In many embodiments, the virtual machine manager 222 may be used to start, stop, and manage the operation of a virtual machine guest. Some virtual machine managers may also be capable of creating new virtual machine guests, configuring virtual devices, and performing other actions.

The devices 204 and 206 may provide applications and services that make up a solution that may be accessed by various client devices 236. In the example of a small business, the solution may provide authentication services, file services, email applications, and other functions to multiple devices.

A management interface 238 may be used in some solutions to manage various components of a solution. A management interface 238 may be a high level interface through which various components of the solution may be viewed, configured, and operated.

FIG. 3 is a diagram of an embodiment 300, showing a device during non-virtual installation. Embodiment 300 is a simplified example of an installation process that may use installation settings to install and configure an operating system, applications, and services. Embodiment 300 may be an example of the installation process that may be used to install the device 204 of embodiment 200, for example.

The device 302 may be any type of device on which an operating system and various applications and services may be installed. In a computer network, such devices may be server computers, desktop computers, laptop computers, and other computer devices. In some cases, the device 302 may be a router, switch, or other network management device. In still other cases, the device 302 may be a handheld device such as a mobile telephone, personal digital assistant, or other computing device.

During an installation process, the hardware platform 304 may be a hardware platform on which no other installation has been performed. The hardware platform 304 may be bootstrapped using a bootable installation environment 306 that may include an installation director 308. The installation director 308 may cause a disk image 312 to be created using installation settings 310. Once the disk image 312 is created, the disk image 312 may be used to bootstrap the hardware platform 304.

The disk image 312 may contain an operating system 314 as well as applications 318 and services 322. In some embodiments, the installation director 308 may be capable of creating the disk image 312 and setting various operating system configuration settings 316, application configuration settings 320, and service configuration settings 324 prior to bootstrapping the hardware platform 304 and executing the operating system 314.

In some embodiments, a disk image 312 may be created that has the operating system 314. That disk image may be used to bootstrap the hardware platform 304 so that the operating system 314 is executing directly on the hardware platform 304 without the bootable installation environment, and then the applications 318 and services 322 may be installed and configured.

A configuration application 326 may be installed in the disk image 312 and may be executed after bootstrapping using the disk image 312. The configuration application 326 may use installation settings 328 to finalize the configuration of the operating system 314, applications 318, or services 322. In some embodiments, the configuration application 326 may install some or all of the applications 318 and services 322.

Applications 318 may be groups of executable code that are designed to perform a specific action or function. In many cases, the applications 318 may be complex, such as managing electronic mailboxes, routing messages, and performing other messaging functions. Services 322 may be background operations that may operate when called by applications or other mechanisms. In many cases, services 322 may have an application programming interface (API) or other mechanism by which the services may be accessed. In many cases, the installation and configuration of applications and services is very similar.

An installation of the device 302 may involve providing executable code for the bootable installation environment 306 to the hardware platform 304. A hardware platform may have multiple devices from which the platform may be bootstrapped. For example, a hardware platform may be capable of bootstrapping over a network connection, through a Digital Versatile Disk (DVD) reader, through a Universal Serial Bus (USB) device, as well as hard disks attached to the device.

In a typical use, a DVD containing an executable bootable installation environment 306 as well as some or all of the information used to create a disk image 312 may be loaded into a DVD reader. The hardware platform 304 may be started and may read and execute the bootable installation environment 306 to begin installation.

During the installation, the installation settings 310 may be provided on a second memory storage device. For example, the installation settings 310 may be provided on a USB flash memory device, a DVD disk, or other storage device. The installation settings 310 may be the installation settings 120 of embodiment 100.

In some embodiments, the installation settings 310 may include all of the installation settings for all of the devices being installed in a solution. In other embodiments, the installation settings 310 may include a subset of installation settings for all of the devices.

The installation settings 328 may be a separate set of installation settings, or may be a subset of installation settings 310 that may be used for configuration after the disk image 312 is booted. For example, a USB flash drive may be attached to the hardware platform 304 that contains both the installation settings 310 and installation settings 328.

Figure 4:
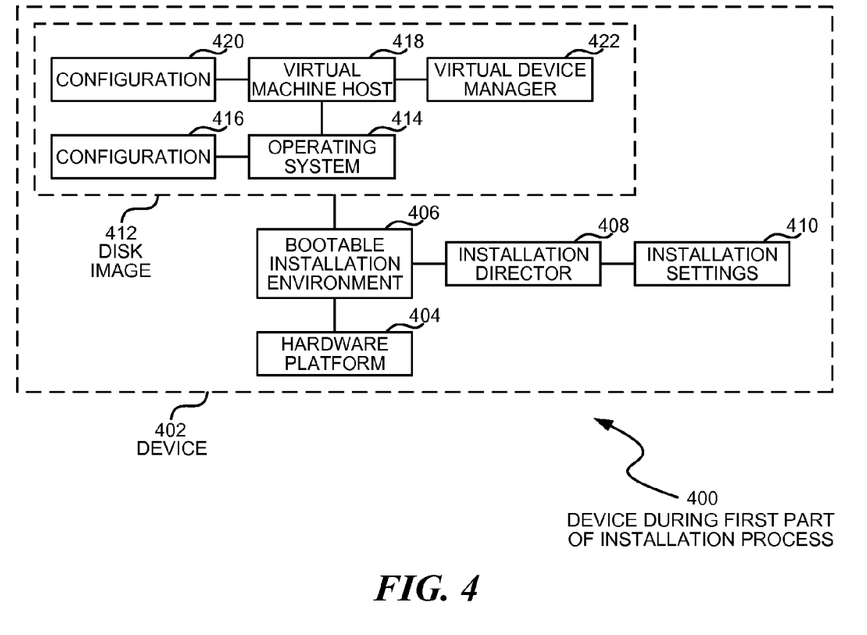
FIG. 4 is a diagram illustration of an embodiment showing a device during the first stage of a virtual machine installation process.

FIG. 4 is a diagram of an embodiment 400, showing a device during a first stage of a virtual installation. Embodiment 400 is a simplified example of an installation process that may use installation settings to install and configure an operating system to host virtual machine guests. Embodiment 400 may be an example of the installation process that may be used to install the device 206 of embodiment 200, for example.

Figure 5:
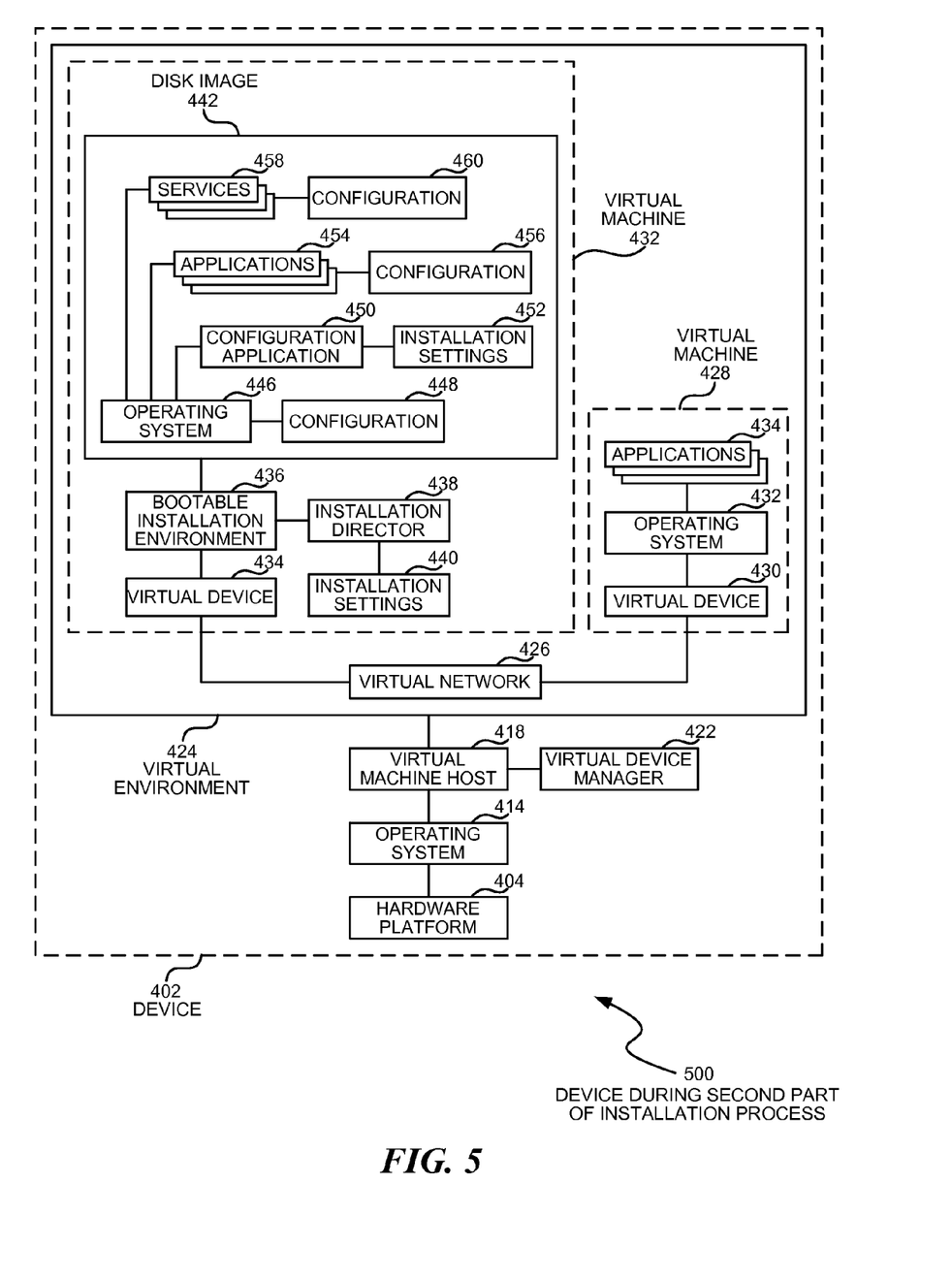
FIG. 5 is a diagram illustration of an embodiment showing a device during the second state of a virtual machine installation process.

Embodiment 400 is similar to embodiment 300, but the installation process may occur in two steps. In the first step illustrated in embodiment 400, a disk image for a virtual machine host may be created. In a second step illustrated in embodiment 500, a virtual machine guest may be installed.

The process and mechanisms of installing a virtual machine host may be similar to that of installing the applications and services as illustrated in embodiment 300.

The device 402 may be a computing device that is capable of hosting virtual devices. In many computing environments, such devices may be powerful server computers, but other systems may host virtual devices as well, such as desktop computers, laptop computers, and other computing devices.

The hardware platform 404 may be bootstrapped using a bootable installation environment 406 that has an installation director 408 and may use installation settings 410. The hardware platform 404, installation director 408, and installation settings 410 may be similar to the respective components illustrated in embodiment 300.

The installation director 408 may cause a disk image 412 to be constructed that includes an operating system 414 that includes a virtual device host 418 and a virtual device manager 422. The operating system 414 may have configuration settings 416 and the virtual device host 418 may have configuration settings 420 that may be configured by the installation director 408 using the installation settings 410.

Once the disk image 412 is created, the hardware platform 404 may be booted using the disk image 412 and the installation operation may progress to a stage as illustrated by embodiment 500.

FIG. 5 is a diagram of an embodiment 500, showing a device during a second stage of a virtual installation, and may be a continuation of the installation started in embodiment 400. Embodiment 500 is a simplified example of an installation process that may use installation settings to install and configure an operating system to host virtual machine guests. Embodiment 500 may be an example of a second step in the installation process that may be used to install the device 206 of embodiment 200, for example.

Embodiment 500 illustrates the device 4020 of embodiment 400 after the virtual machine host is operational and during the installation of a virtual machine.

The hardware platform 404, operating system 414, virtual machine host 418, and virtual device manager 422 are illustrated as operational on the device 402. The virtual machine host 418 may create a virtual environment 424 in which virtual machines 428 and 432 may operate.

The virtual environment 424 may have a virtual network 426 that may connect the various virtual machine guests within the virtual environment. In many embodiments the virtual network 426 may be configured in many different manners. For example, a single virtual network may be created to link the various virtual machines together. Such a network may include a connection to a physical network and other devices connected to the physical network. In some cases, two or more virtual networks may be created to join different virtual machines to different physical networks.

Virtual machine 428 may be illustrated as having been installed and operational. The virtual machine 428 may comprise a virtual device 430, an operating system 432, and applications 434.

The virtual machine 432 may be illustrated as in the process of being installed. The virtual device 434 may be operational with a bootable installation environment 436 with an installation director 438 and installation settings 440. In many embodiments, the bootable installation environment 436, installation director 438, and installation settings 440 may be the same executable software that may be used for direct installation onto physical hardware, such as the same components of embodiment 200.

The installation director 438 may create a disk image 442 that may contain an operating system 446, applications 454, services 458, and a configuration application 450. The installation director 438 may use the installation settings 440 to modify the configuration settings 448, 456, and 460 of the operating system 446, applications 454, and services 458, respectively.

In many embodiments, a configuration application 450 may be installed and may execute when the disk image 442 is used to bootstrap the virtual device 434. The configuration application 450 may use installation settings 452 to perform additional configuration tasks on the operating system 446, applications 454, and service 458.

The illustrations of embodiments 400 and 500 show one example of a process for installing and configuring devices as virtual machines. The devices may have installation settings that may be used by an installation director or configuration application to configure various portions of the devices, including configuring a virtual device, configuring a virtual network, installing and configuring an operating system, as well as applications and services.

Figure 6:
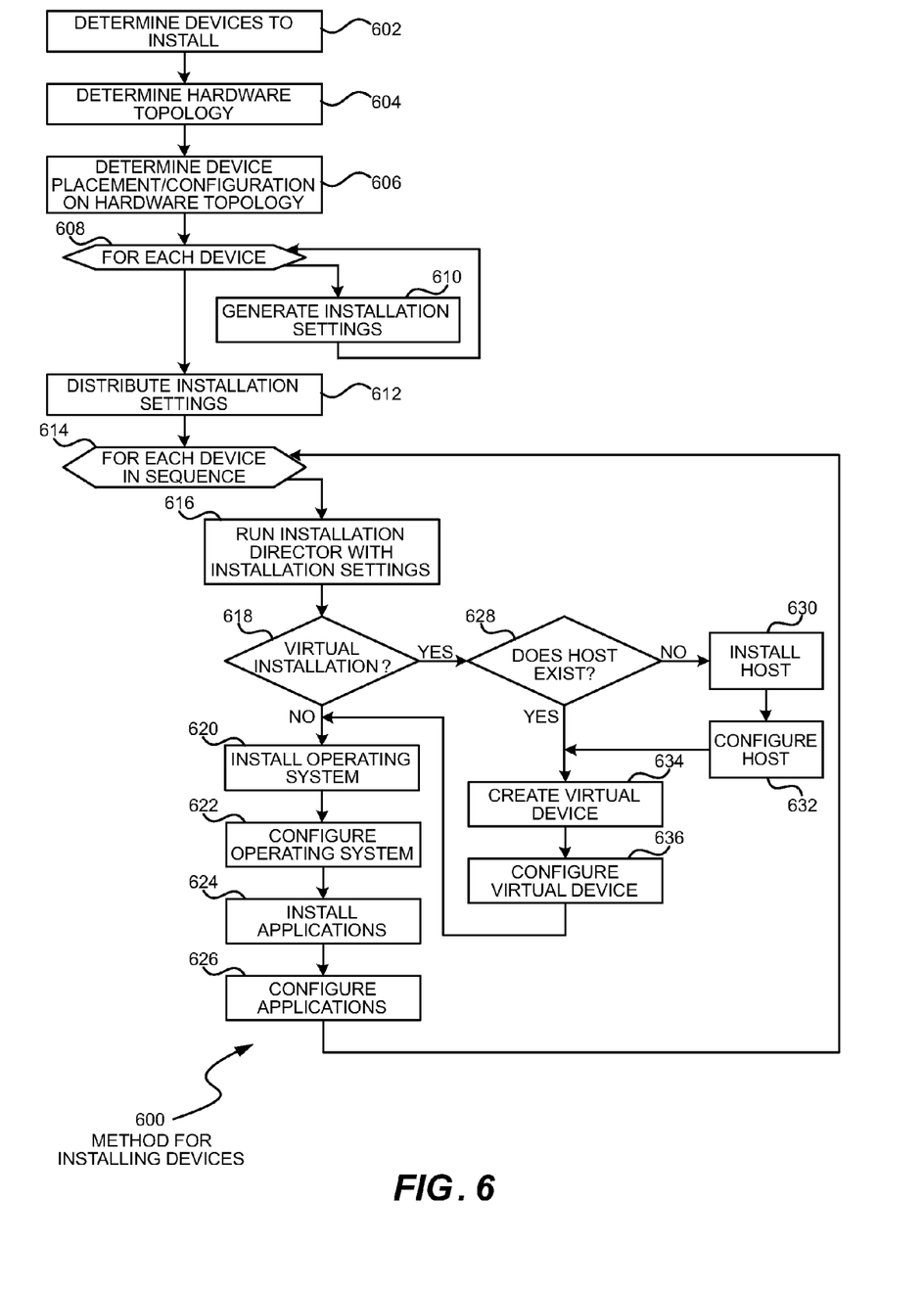
FIG. 6 is a flowchart illustration of an embodiment showing a method for installing devices.

FIG. 6 is a flowchart illustration of an embodiment 600 showing a method for installing devices. Embodiment 600 is an example process that may be used to generate installation settings and use those installation settings to install devices directly on physical hardware or as virtual machine guests in a virtual machine host.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may show a simplified method for performing an installation process. The installation process involves creating the installation settings, which may include determining which devices are implemented virtually, and then using those installation settings to install and configure the devices.

In block 602, the devices to be installed may be determined. In a large solution that may comprise multiple devices, multiple applications, and multiple hardware platforms, a user may be able to identify a subset of those devices to install. In many cases, the identification of block 602 may also include determining performance characteristics, minimum hardware parameters, and other information that may be used to determine device placement and device configuration.

A hardware topology may be determined in block 604. The hardware topology may include identifying which hardware platforms are available. The hardware topology may also include performance descriptions of the hardware platforms, including any peripheral devices, connections to networks, memory capacity, storage capacity, processor capacity. In some cases, the hardware topology may include identifying any pre-installed software such as operating systems, services, or applications.

Device placement and configuration may be determined in block 606, including determining which hardware platforms will host which devices, and if those device are to be hosted as virtual machines. The operations of block 606 may include optimizing, verifying, and other selection operations as described in embodiment 100 for the optimizer 128, verifier 130, and sequencer 132.

For each device in block 608, installation settings for the device may be generated in block 610. The installation settings may be parameters, scripts, sequences, or other information that may be consumed by an installation director or configuration application. The installation settings may include settings used in a bootable installation environment or in an operating system environment.

The installation settings may be distributed in block 612. In cases where a device is installed on a bare hardware platform, the installation settings may be made available on a USB flash memory device, DVD, or other media. In some cases, the installation settings may be distributed over a network to the hardware platform during the installation and configuration process.

For each device according to the sequence in block 614, the installation may occur. The installation illustrated in embodiment 600 includes a full installation of each device. Other embodiments may include a multi-pass installation system where two or more devices may have dependencies on each other. Such an installation system may have one device partially installed, then another device installed, then the first device may have the installation completed.

The installation process may begin with an installation director being executed with the installation settings in block 616. If the installation is not a virtual installation in block 618, the operating system may be installed in block 620 and configured in block 622. The applications may be installed in block 624 and configured in block 626.

In some embodiments, an installation director may create a disk image that may be bootable by a hardware platform or virtual device. Some such embodiments may create a disk image with a configured operating system and applications prior to bootstrapping the respective hardware platform or virtual device.

Other embodiments may use an installation director to install an operating system and, in some cases partially configure the operating system. Such embodiments may bootstrap the device and perform additional configuration and installation activities with a configuration application that may execute within the operating system environment.

If the device is to be installed as a virtual machine guest in block 618, and the virtual machine host does not exist in block 628, the virtual machine host may be installed in block 630 and configured in block 632.

When the virtual host exists and is configured in either blocks 628 or 632, the virtual device may be created in block 634 and configured in block 636. Once the virtual device is configured and operational, the installation may proceed with block 620.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system, said system for creating installation settings for installing a multiple component software solution on hardware, said system comprising:
    a computer hardware storage device; and
    a processor configured to perform a method comprising:
        identifying a plurality of devices to install, said plurality of devices including interoperating software components that implement said multiple component software solution, said plurality of devices including at least a first device and a second device, said first device including a first operating system and a first one or more software components of said multiple component software solution, said second device including a second operating system and a second different one or more software components of said multiple component software solution;
        mapping a hardware topology, said hardware topology including a plurality of hardware platforms available for installation of devices from among said plurality of devices;
        determining an optimized set of installation settings for optimized placement of said plurality of devices across two or more of said plurality of hardware platforms to implement said multiple component software solution, said optimized set of installation settings based on one or more of: an intended use of said component software solution and performance characteristics of said interoperating software components, including:
            determining a plurality of sets of installation settings for installing said plurality of devices by determining a location in said hardware topology for at least said first device and said second device, and determining configurable settings for at least said first device and said second device;
            comparing each of said plurality of sets of installation settings to a set of predefined minimum configurations for each of said devices;
            identifying one or more sets of installation instructions from among said plurality of sets of installation instructions that fail to meet said predefined minimum configurations based on said comparisons;
            screening out said one or more sets of installation settings from said plurality of sets of installation settings to form a remaining one or more sets of installation instructions; and
            selecting an optimized set of installation settings from among said remaining one or more sets of installation instructions; and
        saving said optimized set of installation settings at said computer hardware storage device in a format at least partially consumable by an installation manager to install said multiple component software solution across said two or more of said plurality of hardware platforms.

2. The system of claim 1, wherein determining an optimized set of installation settings for placing said plurality of devices comprises determining that said first device is to be installed as a virtual machine on a first hardware platform and determining that said second device is to be installed as a non-virtual machine on a second hardware platform.

3. The system of claim 2, said installation manager being configured to:
    install a virtual machine host on said first hardware platform as specified in said optimized set of installation settings;
    configure said virtual machine host using said optimized set of installation settings;
    install said first device on said virtual machine host as a virtual machine guest; and
    configure said virtual machine guest using said optimized set of installation settings.

4. The system of claim 3, said installation manager being further configured to:

installing said second device natively on said second hardware platform as specified in optimized set of installation settings, installation of said second device configuring said second hardware platform to interoperate with said first hardware platform to implement at least a portion of the multiple component software solution.

5. The system of claim 4, said plurality of devices also including a third device, said third device including a third operating system and a third different one or more software components of said multiple component software solution and further comprising said installation manager being configured to install said third device on said virtual machine host as a virtual guest machine.

6. The system of claim 1, said optimized set of installation settings comprising settings used for configuring a pre-installed virtual machine host on said first hardware platform and installing said first device on said pre-installed virtual machine host.

7. The system of claim 1, said determining a hardware topology being at least partially performed by presenting a user input mechanism on a user interface.

8. The system of claim 1, said optimized set of installation settings defining a first number of hardware platforms that is less than a second number of said plurality of devices.

9. The system of claim 1, said optimized set of installation settings being defined in XML.

10. A method for creating installation settings for installing a multiple component software solution on hardware, the method comprising:
identifying a plurality of devices to install, said plurality of devices including interoperating software components that implement said multiple component software solution, said plurality of devices including at least a first device and a second device, said first device including a first operating system and a first one or more software components of said multiple component software solution, said second device including a second operating system and a second different one or more software components of said multiple component software solution;
mapping a hardware topology, said hardware topology including a plurality of hardware platforms available for installation of devices from among said plurality of devices;
determining an optimized set of installation settings for optimized placement of said plurality of devices across two or more of said plurality of hardware platforms to implement said multiple component software solution, said optimized set of installation settings based on one or more of: an intended use of said component software solution and performance characteristics of said interoperating software components, including:
determining a plurality of sets of installation settings for installing said plurality of devices by determining a location in said hardware topology for at least said first device and said second device, and determining configurable settings for at least said first device and said second device;
comparing each of said plurality of sets of installation settings to a set of predefined minimum configurations for each of said devices;
identifying one or more sets of installation instructions from among said plurality of sets of installation instructions that fail to meet said predefined minimum configurations based on said comparisons;
screening out said one or more sets of installation settings from said plurality of sets of installation settings to form a remaining one or more sets of installation instructions; and
selecting an optimized set of installation settings from among said remaining one or more sets of installation instructions; and
saving said optimized set of installation settings in a format at least partially consumable by an installation manager to install said multiple component software solution across said two or more of said plurality of hardware platforms.

11. The method of claim 10 further comprising:
starting a first hardware platform using a bootable installation environment, the first hardware platform being one of said two or more of said plurality of hardware platforms;
installing a native operating system on said first hardware platform using said bootable installation environment; and
configuring said native operating system using at least a portion of said optimized set of installation settings.

12. The method of claim 11 further comprising:
installing a virtual machine host on said first hardware platform;
configuring said virtual machine host using said optimized set of installation settings;
installing said first device on said virtual machine host as a virtual machine guest, including;
starting said first device using a virtual machine bootable installation environment of the virtual machine host;
installing said first operating system on said virtual machine host using said virtual machine bootable installation environment; and
configuring said first operating system using at least a portion of said optimized set of installation settings.

13. The method of claim 12 further comprising:
installing said first one or more software components on said virtual machine guest;
configuring said first one or more software components using at least a portion of said optimized set of installation settings.

14. The method of claim 12 further comprising:
configuring a virtual network on said first hardware platform using at least a portion of said optimized set of installation settings.

15. The method of claim 12, said optimized set of installation settings being stored on a removable storage device.

16. A computer hardware storage device comprising:
a configuration manager executable on a processor and configured to perform a method for creating installation settings for installing a multiple component software solution on hardware, the method comprising:
identifying a plurality of devices to install, said plurality of devices including interoperating software components that implement said multiple component software solution, said plurality of devices including at least a first device and a second device, said first device including a first operating system and a first one or more software components of said multiple component software solution, said second device including a second operating system and a second different one or more software components of said multiple component software solution;

mapping a hardware topology, said hardware topology including a plurality of hardware platforms available for installation of devices from among said plurality of devices;

determining an optimized set of installation settings for optimized placement of said plurality of devices across two or more of said plurality of hardware platforms to implement said multiple component software solution, said optimized set of installation settings based on one or more of: an intended use of said component software solution and performance characteristics of said interoperating software components, including:

determining a plurality of sets of installation settings for said plurality of devices by determining a location in said hardware topology for at least said first device and said second device, and determining configurable settings for at least said first device and said second device;

comparing each of said plurality of sets of installation settings to a set of predefined minimum configurations for each of said devices;

identifying one or more sets of installation instructions from among said plurality of sets of installation instructions that fail to meet said predefined minimum configurations based on said comparisons; screening out said one or more sets of installation settings from said plurality of sets of installation settings to form a remaining one or more sets of installation instructions;

ranking the remaining one or more sets of installation instructions; and selecting an optimized set of installation settings from among said remaining one or more sets of installation instructions based on the rankings of said remaining one or more sets of installation instructions; and saving said optimized set of installation settings in a format at least partially consumable by an installation manager to install said multiple component software solution across said two or more of said plurality of hardware platforms.

17. The computer hardware storage device of claim 16 being embodied in a separate medium for each of said plurality of devices.

18. The computer hardware storage device of claim 16 further comprising:

a separate medium for storing said installation settings.

19. The computer hardware storage device of claim 16, said configuration manager configured to determine said hardware topology at least in part by user input.

20. The computer hardware storage device of claim 16 further comprising:

installing said first device as a virtual machine guest on a virtual machine host.

* * * * *